(12) United States Patent
Gist et al.

(10) Patent No.: US 10,202,063 B1
(45) Date of Patent: Feb. 12, 2019

(54) SUPPORT BRACKET FOR A TRACTOR-TRAILER SEMI-TRUCK CAB RACK

(71) Applicant: SUPPORT BRACKET FOR A TRACTOR-TRAILER SEMI-TRUCK CAB RACK, Russellville, AL (US)

(72) Inventors: Jason Forrest Gist, Russellville, AL (US); Danny Byron Gist, Russellville, AL (US)

(73) Assignee: Road Gear Truck Equipment, LLC, Russellville, AL (US)

( * ) Notice: Subject to any disclaimer, the term of this patent is extended or adjusted under 35 U.S.C. 154(b) by 0 days.

(21) Appl. No.: 15/719,146

(22) Filed: Sep. 28, 2017

(51) Int. Cl.
    *B60P 7/08* (2006.01)

(52) U.S. Cl.
    CPC .................. *B60P 7/0846* (2013.01)

(58) Field of Classification Search
    CPC ......... B60P 7/0846; B60P 7/08; B60P 7/0815; B60R 9/00; B60R 9/06
    USPC ...................... 296/3; 280/760, 769
    See application file for complete search history.

(56) References Cited

U.S. PATENT DOCUMENTS

| | | | | |
|---|---|---|---|---|
| 2,914,204 A * | 11/1959 | Groll | ...................... | B21C 47/24 105/355 |
| 3,047,161 A * | 7/1962 | Thacker | .................... | B60P 1/54 212/175 |
| 4,732,420 A * | 3/1988 | O'Neil | ..................... | B60R 11/06 105/347 |
| 4,775,179 A * | 10/1988 | Riggs | ................. | B62D 33/0612 296/180.2 |
| 4,971,380 A * | 11/1990 | Cote | ....................... | B60N 2/682 248/301 |
| D330,180 S * | 10/1992 | Daves | .......................... | D12/223 |
| 5,388,737 A * | 2/1995 | Myers | .................... | B62D 43/02 224/42.24 |
| 5,405,226 A * | 4/1995 | Daves | ....................... | B60P 7/15 211/4 |
| 5,660,408 A * | 8/1997 | Johnson | .................... | B60D 1/62 248/75 |
| 5,961,092 A * | 10/1999 | Coffield | ................. | H01Q 1/125 248/230.1 |
| 6,641,101 B2 * | 11/2003 | Bergin | ..................... | A47C 7/62 248/223.41 |
| 6,969,087 B2 * | 11/2005 | Larson | ................... | B62D 43/02 224/42.21 |
| 7,100,933 B2 * | 9/2006 | Zackovich | ................ | B60P 3/12 280/402 |
| 7,926,831 B2 * | 4/2011 | Blair | ..................... | B62D 49/005 280/418.1 |
| 7,997,641 B2 * | 8/2011 | Ebinger | ............... | B62D 33/067 296/187.03 |
| 8,657,324 B2 * | 2/2014 | Waldner | .............. | B60R 16/0215 280/420 |
| 10,046,691 B2 * | 8/2018 | Petru | ....................... | B60R 9/045 |
| 2002/0179795 A1 * | 12/2002 | Bergin | ..................... | A47C 7/62 248/311.2 |

(Continued)

*Primary Examiner* — Patrick D Hawn
(74) *Attorney, Agent, or Firm* — David W. Holt; Dennis H. Núñez; Bradley Arant Boult Cummings LLP

(57) ABSTRACT

A unitary support bracket for a tractor-trailer semi truck cab rack. The device comprises a metal panel surrounded by a metal flange. The unitary construction and curved design provide structural support for the heavy loads borne by tractor-trailer semi truck cab rack.

18 Claims, 6 Drawing Sheets

(56) References Cited

U.S. PATENT DOCUMENTS

| | | | |
|---|---|---|---|
| 2005/0093320 A1* | 5/2005 | Brauer | B62D 33/0207 |
| | | | 296/3 |
| 2008/0100032 A1* | 5/2008 | Alguera Gallego | B60D 1/62 |
| | | | 280/420 |
| 2010/0301721 A1* | 12/2010 | Nebel | B60R 11/06 |
| | | | 312/326 |
| 2017/0106918 A1* | 4/2017 | Diller | B60R 3/002 |

* cited by examiner

SUPPORT BRACKET FOR A TRACTOR-TRAILER SEMI-TRUCK CAB RACK

BACKGROUND

Tractor-trailer semi trucks are utilized for the transport of cargo throughout the U.S. and around the world. A tractor-trailer semi truck consists of a tractor unit with an engine and one or more trailer units attached to the tractor unit.

The tractor unit includes a driving cab, and may also include a sleeping area. Securing a load for transport by tractor-trailer semi truck generally requires the use of many lengths of chains and/or binders to ensure that the cargo does not shift during transport and cause injury to either the driver or other motorists on the highway. When not in use, the chains and binders may be mounted on a heavy-duty metal rack (also referred to as a cab rack) located behind the rear wall of the tractor unit, in front of the connection point for the trailer unit. The cab rack is generally mounted on two or more support brackets, and includes hooks and other attachment points for storing and transporting the chains, binders, and other equipment used to secure cargo loads.

In some designs, cab racks are mounted on three-piece brackets formed from lengths of aluminum I-beam. The brackets generally have an upright support and base welded at a right angle, then reinforced with a third bar welded diagonally between the upright support and base. Thus, the bracket is formed and secured by three weld-points which are the width of the I-beam used in construction of the bracket, generally only a few inches wide. The weight of the equipment mounted on the cab rack may be quite substantial and applies a mechanical stress on the support brackets supporting the rack. The weld point between the diagonal and the upright support is particularly susceptible to the combined mechanical forces from weight of the equipment on the cab rack, and the vibrational motion of the cab unit during transport. These forces can eventually result in failure of the support bracket. Therefore, it would be desirable for a support bracket to have a unitary design to eliminate the structural weakness that can occur at the weld of the diagonal bar. Further, it would be desirable for a support bracket to support a distributed static load of up to 12,500 lbs. or more without failure. These objects and others are addressed by the claimed invention.

SUMMARY

The following disclosure provides for a support bracket for a tractor-trailer semi truck cab rack. In some embodiments, the bracket comprises a generally L-shaped metal plate with an upright portion, a base portion, and a curved portion, a metal flange attached to the edge of and perpendicular to the metal plate to form a rear surface, a base surface, a front surface, and an inner curve surface connecting the upright portion and the base portion, and one or more attachment slots adjacent to and parallel with the base surface.

Also disclosed is a support bracket comprising a generally curved L-shaped aluminum plate, 3/16 inch thick, forming a base portion approximately 29 inches long and 5 inches high, an upright portion approximately 72 inches high with a backboard attachment surface approximately 50 inches high, and a curved portion between the upright and base portions, an aluminum flange attached in a perpendicular orientation to the aluminum plate to form rear, front, base and curved inner surfaces, where the inner surface curves between the upright portion and the base portion with a radius of curvature of approximately 17 inches, an attachment slot parallel to the base surface, a bracket tab passing through the attachment slot having a width of 3 inches, and one or more reinforcement tabs located between the base surface and the bracket tab to reinforce the attachment slot.

Also disclosed is a rack for a tractor-trailer semi truck comprising support brackets which are generally L-shaped aluminum plates forming an upright portion and a base portion, an aluminum flange attached to the edge of and perpendicular to the metal plate, the flange forming rear, front, base and inner curved surfaces, the inner curved surface connecting the upright portion and the base portion, one or more attachment slots adjacent to and parallel with the base surface. The rack may also include a backing board, and attachment bolts.

BRIEF DESCRIPTION OF THE DRAWINGS

FIG. 3B, rear view; and FIG. 3C, top view).

DETAILED DESCRIPTION

Figure 1:
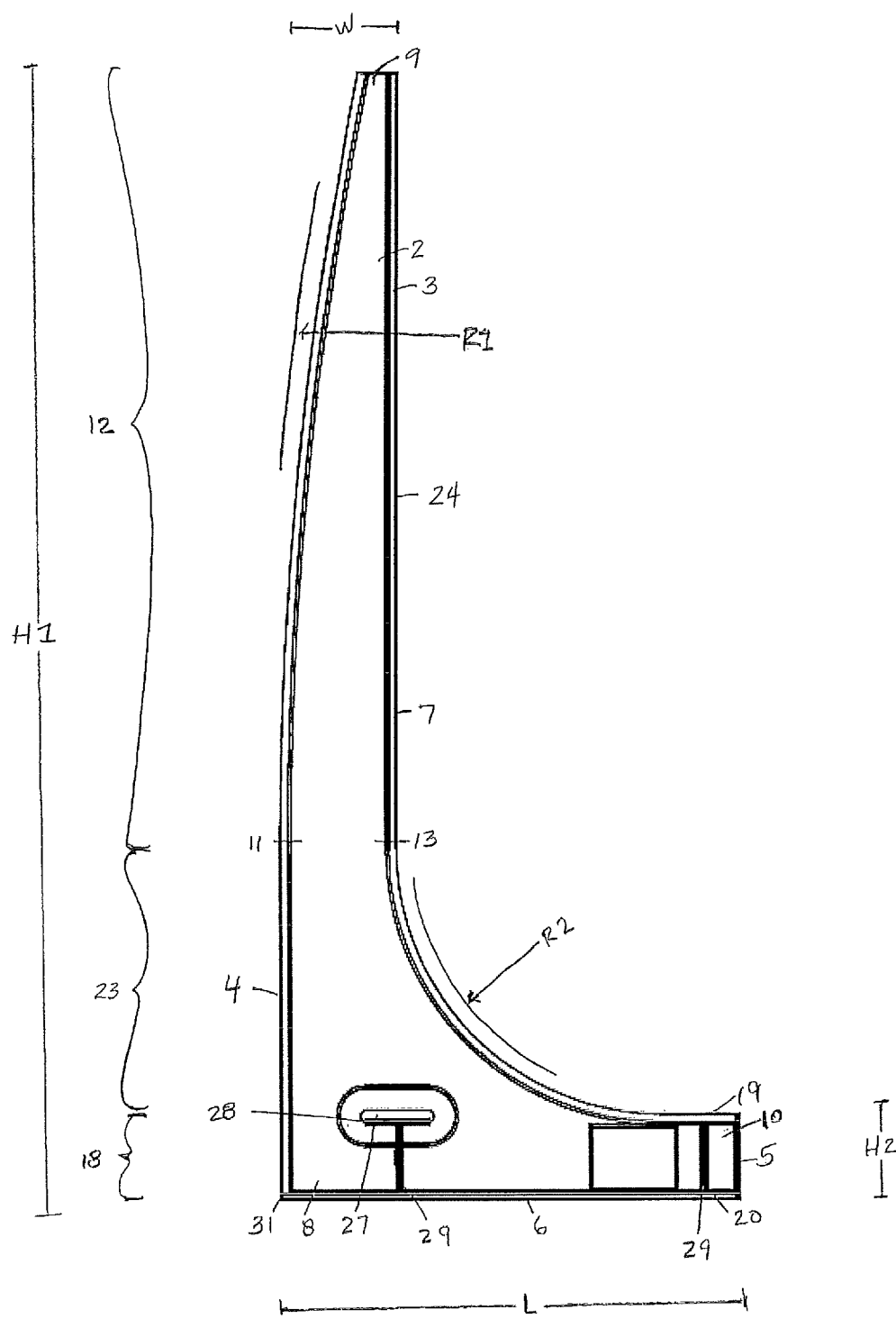
FIG. 1 is a perspective view of a support bracket according to one embodiment.
Figure 2:
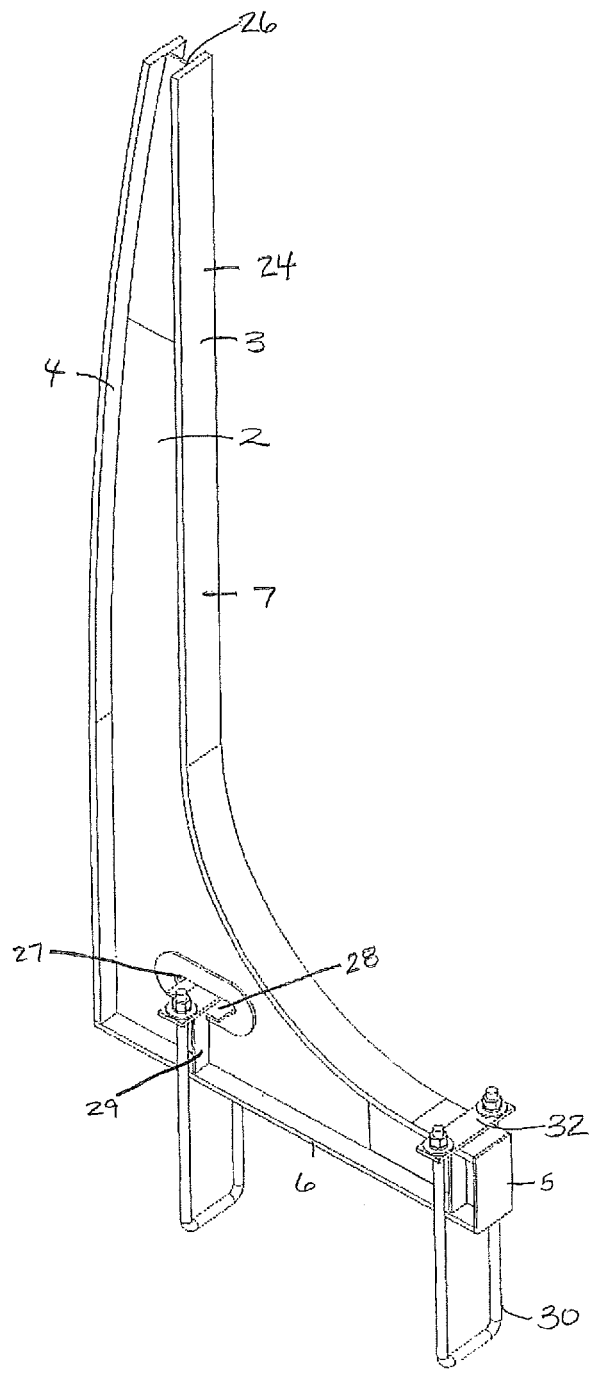
FIG. 2 is an alternative perspective view of the support bracket of FIG. 1.
Figure 3A:
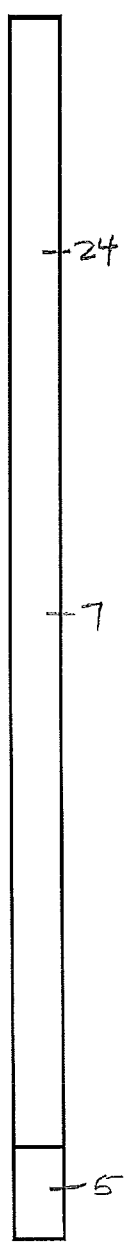
FIG. 3A-C are alternative views of the support bracket of FIG. 1 (FIG. 3A, front view.
Figure 3B:
Figure 3C:
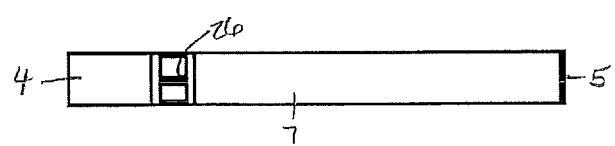
Figure 4:
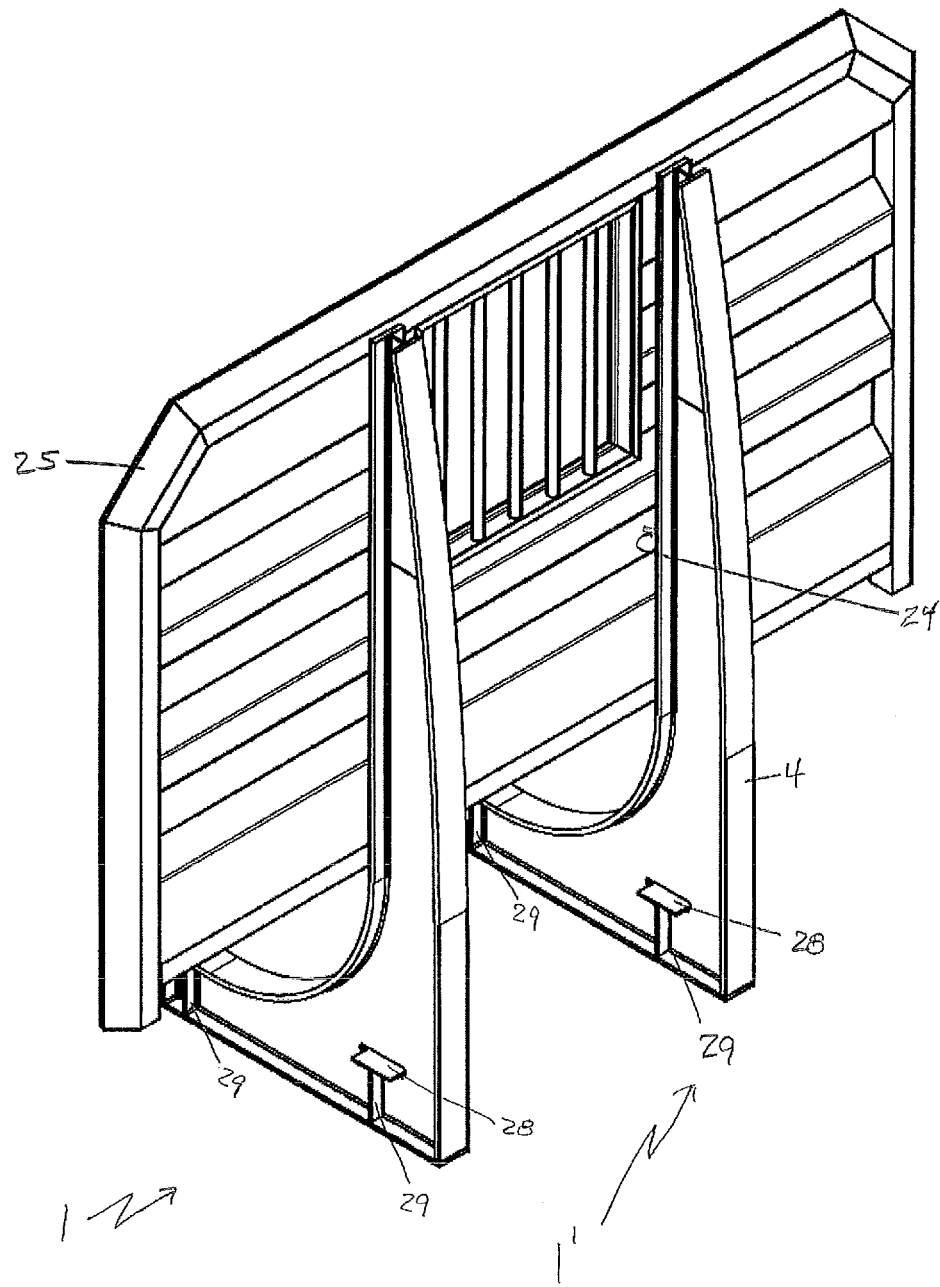
FIG. 4 is a rear perspective view of a cab rack with a backing board and two support brackets according to one embodiment.
Figure 5:
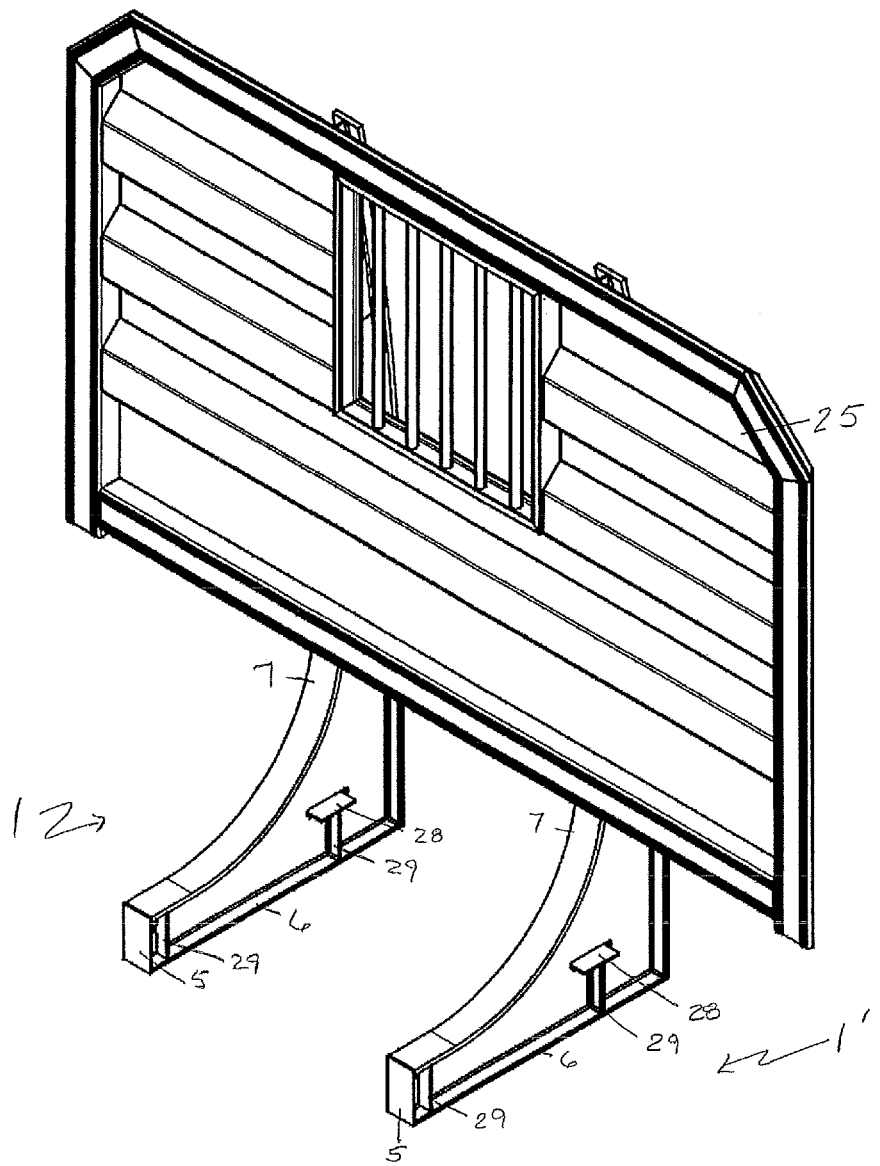
FIG. 5 is a front perspective view of a cab rack with a backing board and two support brackets according to one embodiment.
Figure 6:
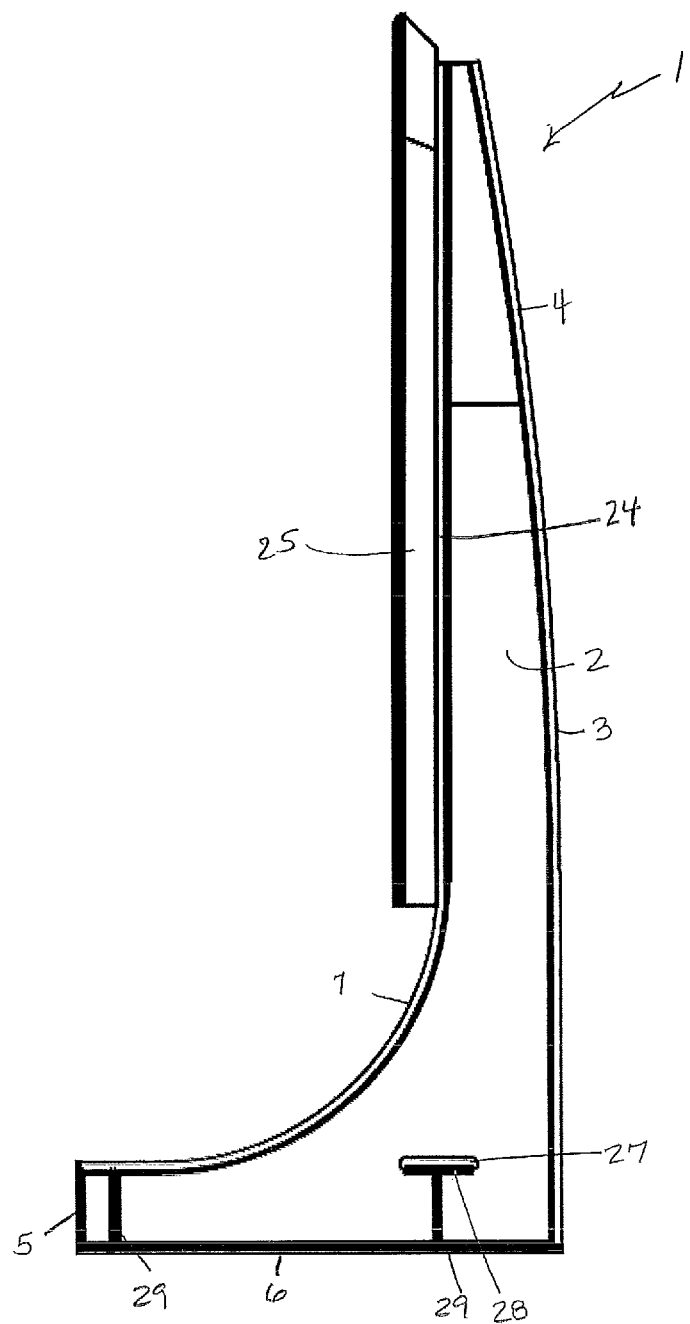
FIG. 6 is a side view of a cab rack with a backing board and two support brackets according to one embodiment.

A support bracket for a tractor-trailer semi truck cab rack is disclosed. In a broad general embodiment as shown in FIG. 1, the support bracket may be generally L-shaped with an upright portion, middle portion, and a base portion. The inner edge of the middle portion may be curved to distribute static forces and increase the mechanical strength of the support bracket. An attachment feature near the bottom edge of the support bracket may serve as a point for securing the base of the support bracket to the frame of the tractor unit. Two or more brackets may be used to support the backing board of the cab rack as shown in FIGS. 4 and 5. While the support bracket may described as generally L-shaped, as described herein and shown in the drawings, certain surfaces may be curved. Thus, when described as generally L-shaped, it will be recognized by those of skill in the art that the embodiments described herein are broader than a bracket having a horizontal portion and a vertical portion forming a right angle.

As shown in the embodiment of FIG. 1, the support bracket 1 may be of unitary design, comprising a metal plate 2 and a metal flange 3. In use, the metal plate 2 is in an upright position, generally perpendicular to and extending away from the back surface of the tractor unit toward the trailer. The plate 2 has an upright portion 12, middle portion 23, and a base portion 18. The inner edge of the middle portion 23 is curved between the upright portion 12 and the lower portion 18. The metal flange 3 is attached perpendicular to the metal plate 2 along all or most edges of the plate 2 such that the flange 3 forms a rear 4, front 5, base 6 and inner 7 surface. Although not shown in the present embodiments, the metal flange 3 may also form an upper surface at the upper edge 9 of the plate. Attaching the metal plate 2 at the longitudinal midline of the flange 3 distributes the load evenly across the flange 3 and allows interchangeable use of the brackets at the left or right side of the cab unit. In other embodiments, the metal plate 2 may be attached off-center relative to a longitudinal midline of the flange metal 3, in which case the left support bracket and the right support bracket would be mirror images. In some embodiments, the metal plate 2 of the bracket 1 may be formed from two or more segments joined by a weld or other connection. Similarly, in some embodiments, the metal flange 3 of the bracket 1 may be formed from two or more segments joined by a weld or other connection.

The support bracket 1 may be formed of any suitable metal known in the art. Because tractor-trailer semi trucks are subject to regulations that limit the overall weight of the vehicle, in some embodiments, the support bracket may be constructed of aluminum which is lightweight, yet strong. In other embodiments where weight is not a limiting concern, the support bracket may be formed from steel, composite, or other structurally rigid material. In some embodiments the metal plate 2 and flange 3 may be made of different materials.

The support bracket 1 is sized and configured for attachment to the tractor unit. The support bracket 1 may generally be approximately the height of the cab of the tractor unit. In some embodiments, the height (H1) of the support bracket 1, measured from lower edge 8 to upper edge 9 may be between 60-inches and 80-inches. In some embodiments, the height (H1) of the support bracket 1 may be approximately 68, 72, or 75 inches. In some embodiments, the length (L) of the support bracket as measured from front edge 10 to rear edge 11 is between 24-inches and 36-inches. In some embodiments, the length (L) of the support bracket 2 is between 28-inches and 30-inches. In one embodiment, the length (L) of the support bracket 2 is approximately 29-inches. The exact dimensions of the height (H1) and length (L) of the support bracket 2 may be varied depending upon the manufacturer and model of tractor unit to which the cab rack will be attached. It is within the skill of a person of art to determine the height (H1) and length (L) dimensions for mounting to a particular model of tractor. The overall height (H1) and length (L) of the support rack 1 may vary due to the thickness of the flange 3 used in construction as discussed below. It is within the skill of the person in the art to determine how the selection of a particular thickness of flange metal 3 will increase or decrease the height and length of the support bracket 1.

The metal plate 2 of the support bracket 1 may be of varying thickness, but is preferably between ⅛-inch and ½-inch in thickness. In some embodiments, the metal plate is 3/16-inch thick. The width (W) of the upright portion 12 of the support bracket as measured from the rear edge 11 to the inner edge 13 may be between 5-inches and 7-inches wide. While referred to as "upright portion" 12, it should be understood that the described structure may not be a separate structure, but rather may just be a different portion of the plate $2_{[HS1]}$. In some embodiments, as shown in FIG. 1, the width (W) of the upright portion 12 tapers from a first width adjacent the curved middle portion 23 to a second width at the upper edge 9 of the plate. In some embodiments, the radius of curve of the inward taper R1 is between 300% and 400% of the height of the upright portion 12 of the support bracket 1. In some embodiments, the radius of the curve R1 is between approximately 200 and 300 inches. In one embodiment, the width of the upright portion 12 adjacent the middle portion 23 is approximately 7-inches and tapers to approximately 3-inches at the upper edge 9 of the plate, wherein the rear edge 11 of the plate 2 is inwardly tapered toward the upper edge 9 with a radius of curve R1 of approximately 255-inches. In some embodiments, the rear surface 4 of the upright portion 12 is inwardly tapered away from the back wall of the cab while the inner surface 7 remains generally straight and upright, perpendicular to the ground.

The height (H2) of the base portion 18 (which may not be a separate structure, but just a different portion of the plate 2) of the support bracket 2 may be between 3-inches and 8-inches measured from top edge 19 of the base portion 18 to bottom edge 20 of the base portion 18. In some embodiments, the height (H2) of the base portion 18 is between 5-inches and 7-inches. In some embodiments, the height (H2) of the base portion 18 is 5-inches. The bottom edge 20 of the base portion 18 is preferably generally straight. As shown in FIG. 1, the rear surface 4 and the base surface 6 meet at a corner 31. In some embodiments, the corner 31 may be substantially a right angle. In other embodiments, the corner 31 may be rounded and the metal plate 2 may be rounded at that location.

The inner surface of the upright portion 12 is preferably generally straight and oriented perpendicular to the ground to form a backing board attachment surface 24. The inner surface 7 of the middle portion 23 of the support bracket 2 is generally curved between the upright portion 12 and base portion 18 to distribute the load across the support bracket 1. In some embodiments, the radius of the curve R2 of the middle portion 23 may be between 20% and 30% of the height of the support bracket 1. In some embodiments, the radius of curve R2 of the middle portion 23 is between approximately 12 and 20 inches. In one embodiment, the radius of the curve R2 of the middle portion 23 is approximately 17-inches. Where the radius of the curve R2 of the middle portion 23 is larger, the backing board attachment surface 24 will be shortened providing less surface for the attachment of the backing board 25. Where the radius of the curve R2 is small, the dissipation of mechanical forces across the middle portion 23 may be reduced.

The metal flange 3 may be of varying width, but is preferably between 1-inch and 6-inches in width. In some embodiments, the width of the flange 3 is equal to the width of the frame rails of the tractor unit. In some embodiments, the width of the flange 3 is 3-inches. The metal flange 3 may be of varying thickness, but is preferably between ⅛-inch and ½-inch in thickness. In some embodiments, the flange 3 is the same thickness at the rear surface 4, front surface 5, base surface 6, and inner surface 7. In other embodiments, the flange 3 may be of different thicknesses at the rear surface 4, front surface 5, base surface 6, and inner surface 7. In some embodiments, the flange 3 of the inner surface 7 is thicker than the flange of rear surface 4, front surface 5 or the base surface 6. In some embodiments, the flange 3 may be 3/16-inch thick. In some embodiments, the flange 3 may be ½-inch thick. In other embodiments, the flange 3 at the rear surface 4, the front surface 5, and the base surface 6 is 3/16-inch thick, and the flange 3 at the inner surface 7 is ½-inch thick.

The flange 3 may be attached to the metal plate 2 by welding or other connection, or may be formed as a unitary piece. In some embodiments, the flange 3 is attached to the metal plate 2 by fillet welding of one side of the T-joint 26 between the flange 3 and the metal plate 2. In other embodiments, the flange 3 is attached to the metal plate by fillet welding on both sides of the T-joint 26 between the flange 3 and the metal plate 2. In some embodiments, the fillet weld is continuous. In other embodiments, the fillet weld is intermittent. In one embodiment, the flange 3 is attached to the metal plate 2 by a continuous fillet weld on both sides of the T-joint 26.

The flange 3 is attached to the rear edge 11 of the metal plate 2 to form a rear surface 4 of the support bracket 1. The flange 3 is attached to the lower edge 8 of the metal plate to form a base surface 6 of the support bracket 1. At the corner 31, a joint may be formed between the flange 3 of the rear surface 4 and the flange 3 of the base surface 6, and the joint secured by welding. A length of flange 3 may be attached to the upper edge 9 of the metal plate to form an upper surface. A length of flange 3 may be attached to the front edge 10 of the metal plate to form a front surface 5. A length of flange 3 may be attached to the inner edge 13 of the L-shaped metal plate 2 to form a curved inner surface 7. The flange 3 of the curved inner surface 7 may form one continuous strip from the upper edge 9 of the plate 2 in the upright portion to the front edge 10 of the plate 2 in the base portion 18.

The support bracket 1 may include one or more attachment features for attaching the bracket 1 to the cab unit. In some embodiments, the support bracket 1 may include one or more slots 27 passing through the base portion 18. The slot 27 may be generally parallel to the base surface 6 of the support bracket 1. The slot 27 may further comprise a bracket tab 28 passing through the slot 27 and parallel to the base surface 6. The bracket tab 28 may provide additional mechanical support for a fastener securing the support bracket 1 to the tractor unit. In some embodiments, the fastener is a U-bracket 30. In some embodiments, the bracket tab 28 may be the same width as the width of flange 3. In other embodiments, the bracket tab 28 may be have a smaller width than the width of flange 3. A bracket tab 28 with a width equal to or less than the width of the flange 3, will fit within the cross-bar 32 of a U-bracket 30 used to secure the support bracket 1 to a tractor unit.

The support bracket 1 may include one or more upright reinforcement tabs 29. A reinforcement tab 29 may comprise a length of metal attached to the plate 2 between the flange 3 of the base surface 6 and the attachment slot 27. Reinforcement tabs 29 may also be attached to the plate 2 in one or more locations between the top edge of the base member 19 and the bottom edge of the base member 20. A reinforcement tab 29 may provide additional mechanical strength to an attachment location.

The combination of the metal plate thickness, flange thickness, curve radius of the middle portion contribute to the static loads that may be supported by the support brackets. The reinforcement tabs may provide increased load tolerances and may be used with any thickness of metal plate and flange to improve load tolerance. In some embodiments, a single support bracket may support a load exceeding 12,500 lbs, equating to a load of 25,000 lbs for a backing board supported by a pair of support brackets.

In one embodiment, the support bracket 1 comprises a generally L-shaped aluminum plate 2 with a height of 72 inches, a length of 29 inches, and a width of 3/16 inch. The inner edge of the plate 13 is curved with a curve radius of 17 inches. The backing board attachment surface 24 is approximately 50 inches high. The height of the base portion 18 is approximately 5 inches. The upright portion 12 tapers inward from the rear surface 4 from approximately 7 inches in width at adjacent the middle portion 23 to approximately 3 inches in width at the upper edge of the plate 9. The radius of curvature of the tapering of the upright portion 12 is approximately 255½ inches. The rear surface 4, front surface 5 and base surface 6 comprise a metal flange 3 that is 3/8 inch thick and 3 inches wide. The inner surface 7 comprises a metal flange 3 that is ½ inch thick and 3 inches wide. The base portion 18 comprises an attachment slot 27 parallel to the base surface 6. A bracket tab 3 inches wide passes through the slot 27, parallel to the base surface 6. The base portion 18 includes two upright reinforcement tabs 29 on each surface of the plate 2, one reinforcement tab 29 located between the base surface 6 and the bracket tab 28 and one reinforcement tab 29 located adjacent the front surface 5, between the top edge of the base member 19 and the bottom edge of the base member 20. A bracket according to this exemplary embodiment has a static load capacity of 12,500 lbs.

Referring to FIGS. 4 and 5, a cab rack comprises 2 support brackets 1, 1' joined to a backing board 25 at their backing board attachment surfaces 24. The support brackets are spaced apart at a distance that corresponds to the distance between frame rails of a tractor unit. It is within the skill of a person of art to determine the spacing of support brackets for a specific manufacturer and model of tractor unit. The support brackets 1, 1' may be joined to the backboard 25 by fillet welding.

What is claimed:

1. A bracket configured to be attached to a tractor-trailer semi truck cab rack, the bracket comprising:
   a. a metal plate with an edge and a plate thickness, the plate comprising an upright portion, a base portion, and a curved portion located between the upright portion and the base portion;
   b. a metal flange attached to the edge of and perpendicular to the metal plate, the metal flange having a flange width and a flange thickness, the flange forming a rear surface of the bracket, a base surface of the bracket, a front surface of the bracket, and an inner curved surface of the bracket;
   c. one or more attachment slots adjacent to and parallel with the base surface of the bracket; and
   a metal bracket tab through the attachment slot and parallel to the base surface.

2. The bracket of claim 1, wherein the metal plate and metal flange are aluminum.

3. The bracket of claim 1, further comprising a metal reinforcement tab on the metal plate, extending between the base surface and the attachment slot, and perpendicular to the base surface.

4. The bracket of claim 1, wherein the rear surface of the upright portion is inwardly curved toward an upper edge of the upright portion.

5. The bracket of claim 4, wherein a radius of curvature of the rear surface of the upright portion is between 300% and 400% of the height of the bracket.

6. The bracket of claim 5, wherein the radius of curvature of the rear surface of the upright portion is approximately 255 inches.

7. The bracket of claim 1, wherein the inner curved surface has a curve radius that is between 20% and 30% of the height of the bracket.

8. The bracket of claim 7, wherein the curve radius of the inner curved surface is 17 inches.

9. The bracket of claim 1, wherein the flange is attached to the plate by a weld.

10. The bracket of claim 9, wherein the weld comprises a continuous fillet weld.

11. The bracket of claim 1, wherein an upper portion of the inner curved surface comprises a backing board attachment surface that is generally flat and perpendicular to the base portion.

12. A rack for a tractor-trailer semi truck comprising a first support bracket, the bracket comprising:
   an aluminum plate with an edge and a plate thickness, the aluminum plate forming an upright portion with a height, a base portion with a length, and a curved portion with a curve radius;
   an aluminum flange attached to the edge of and perpendicular to the metal plate, the metal flange having a flange width and a flange thickness, the flange forming a rear surface of the upright portion, a base surface and a front surface of the base portion, and an inner curved surface of the curved portion;
   one or more attachment slots adjacent to and parallel with the base surface; and
   an upper portion of the inner curved surface comprises a backing board attachment surface that is generally flat and perpendicular to the base portion.

13. The rack of claim 12, further comprising a second support bracket and a backing board, wherein the backing board attachment surface of the first and second support brackets are attached to a rear surface of the backing board.

14. The rack of claim 13, wherein the backing board is attached to the brackets by a weld.

15. The rack of claim 13, further comprising an attachment bolt for attaching the bracket to a tractor unit.

16. A support bracket comprising:
   an aluminum plate with an edge and a thickness of 3/16 inch forming a base portion with a length of 29 inches and a base height of approximately 5 inches, and an upright portion with a height of 72 inches, the upright portion having a rear surface and a backing board attachment surface, the backboard attachment surface having a height of approximately 50 inches, and a middle portion located between the upright portion and the base portion and having a curved inner edge with a radius of curvature of 17 inches;
   an aluminum flange attached in a perpendicular orientation to the edge of the aluminum plate to form a rear surface, front surface, base surface and a curved inner surface;
   an attachment slot parallel to the base surface;
   a bracket tab passing through the attachment slot, the bracket tab parallel to the base surface and having a width of 3 inches; and
   one or more reinforcement tabs located between the base surface and the bracket tab to reinforce the attachment slot.

17. The support bracket of claim 16, wherein:
   an aluminum flange with a thickness of 3/8 inch and a width of 3 inches forms the rear surface, front surface and base surface; and
   an aluminum flange with a thickness of 1/2 inch and a width of 3 inches forms the inner surface.

18. The bracket of claim 16, wherein the rear surface of the upright portion tapers inwardly from a first upright width of approximately 7 inches to a second upright width of approximately 3 inches, wherein a radius of curvature of the taper is approximately 255 inches.

* * * * *